US012497578B2

(12) United States Patent
Flannery et al.

(10) Patent No.: US 12,497,578 B2
(45) Date of Patent: Dec. 16, 2025

(54) DETERGENT COMPOSITIONS

(71) Applicant: The Procter & Gamble Company, Cincinnati, OH (US)

(72) Inventors: Jonathan Harris Flannery, Columbia Township, OH (US); Sherri Lynn Randall, Hamilton, OH (US); Philip John Porter, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 696 days.

(21) Appl. No.: 17/541,310

(22) Filed: Dec. 3, 2021

(65) Prior Publication Data

US 2023/0174902 A1 Jun. 8, 2023

(51) Int. Cl.

| | |
|---|---|
| ***C11D 1/00*** | (2006.01) |
| ***C11D 1/02*** | (2006.01) |
| ***C11D 1/66*** | (2006.01) |
| ***C11D 1/83*** | (2006.01) |
| ***C11D 3/04*** | (2006.01) |
| ***C11D 3/20*** | (2006.01) |
| ***C11D 3/33*** | (2006.01) |
| ***C11D 3/50*** | (2006.01) |
| ***C11D 9/44*** | (2006.01) |
| ***C11D 11/00*** | (2006.01) |
| *C11D 1/14* | (2006.01) |
| *C11D 1/22* | (2006.01) |
| *C11D 1/72* | (2006.01) |

(52) U.S. Cl.

CPC .............. *C11D 3/2079* (2013.01); *C11D 1/83* (2013.01); *C11D 3/046* (2013.01); *C11D 3/33* (2013.01); *C11D 3/50* (2013.01); *C11D 1/146* (2013.01); *C11D 1/22* (2013.01); *C11D 1/721* (2013.01); *C11D 2111/12* (2024.01)

(58) Field of Classification Search

CPC .... C11D 1/00; C11D 1/02; C11D 1/66; C11D 1/83; C11D 3/2075; C11D 3/2079; C11D 3/50; C11D 3/505; C11D 7/265; C11D 9/44; C11D 11/00

See application file for complete search history.

(56) References Cited

U.S. PATENT DOCUMENTS

2009/0081311 A1* 3/2009 Man ........................ A61L 2/183
424/616

FOREIGN PATENT DOCUMENTS

| | | | | | |
|---|---|---|---|---|---|
| EP | 0571677 | A1 | 12/1993 | | |
| EP | 1441024 | A1 | 7/2004 | | |
| JP | H0640877 | A | 2/1994 | | |
| JP | 2008517051 | A | 5/2008 | | |
| WO | 03060050 | A1 | 7/2003 | | |
| WO | 2006043177 | A1 | 4/2006 | | |
| WO | WO 2019/071174 | * | 4/2019 | ............... | C11D 3/20 |
| WO | WO-2019071174 | A1 * | 4/2019 | ............... | C11D 3/20 |

OTHER PUBLICATIONS

PCT Search Report and Written Opinion for PCT/US2022/080392 dated Mar. 7, 2023, 12 pages.

* cited by examiner

*Primary Examiner* — Brian P Mruk
(74) *Attorney, Agent, or Firm* — Andrew J. Mueller; George H. Leal

(57) ABSTRACT

Detergent compositions can include a surfactant; cloudiness causing perfume ingredient; and octanoic acid, nonanoic acid, decanoic acid, or a combination thereof. Also included are methods of solubilizing cloudiness causing perfume ingredients.

19 Claims, No Drawings

DETERGENT COMPOSITIONS

FIELD OF THE INVENTION

The present disclosure is directed to detergent compositions which include a surfactant; cloudiness causing perfume; and octanoic acid, nonanoic acid, decanoic acid, or a combination thereof, and methods of solubilizing cloudiness causing perfume.

BACKGROUND OF THE INVENTION

Surfactant containing compositions which also include perfumes can have issues with clarity. Specifically, if perfumes are unable to be adequately solubilized within a surfactant containing composition, the composition may appear hazy. In addition, incomplete solubilization of perfume can lead to product instability and inconsistent performance of the fragrance within the surfactant containing composition. Previous attempts to solve this issue have included increasing the amount of surfactant, however, where high levels of surfactant are not desired or not feasible, this is not an acceptable solution. As such, there is still a need for methods of solubilizing perfumes in surfactant containing compositions and such compositions.

SUMMARY OF THE INVENTION

Disclosed herein is a liquid detergent composition comprising: a) from about 5% to about 20%, by weight of the composition, of surfactant; b) from about 0.1% to about 3%, by weight of the composition, of a C8-C10 fatty acid, wherein the ratio of surfactant to C8-C10 fatty acid by weight ranges from about 200:1 to about 2:1; and c) a perfume comprising a perfume ingredient which has a carbon to oxygen ratio by number of atoms of about 5:1 to about 20:1 and the molecular weight of the perfume ingredient is about 155 Daltons or higher; wherein the liquid detergent composition has a percent transmittance of at least 70% measured at the dominant wavelength of the product and in the absence of opacifiers, encapsulates, and structurants.

Disclosed herein is a liquid detergent composition, comprising: a) from about 5% to about 20% by weight of the composition of a surfactant comprising an anionic surfactant; b) from about 0.2% to about 4% by weight of the composition of a perfume comprising a perfume ingredient comprising dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof 10% or more by weight of the perfume; and c) from about 0.1% to about 3% by weight of the composition of a C8-C10 fatty acid, wherein the composition has a transmittance of at least 70% when measured at the dominant product wavelength.

Also disclosed herein is a method of solubilizing one or more perfume ingredients in a surfactant containing composition comprising: combining the perfume ingredient with a C8-C10 fatty acid; wherein the perfume ingredient has a carbon to oxygen ratio of about 5:1 to about 20:1 and the molecular weight of the perfume ingredient is about 155 Daltons or higher, and wherein the ratio by weight of surfactant to C8-C10 fatty acid is from about 200:1 to about 2:1 and the surfactant containing composition has a percent transmittance of at least 70% as measured at the dominant product wavelength and in the absence of opacifiers, encapsulates, and structurants.

These and other incarnations will be more fully described throughout the specification.

DETAILED DESCRIPTION OF THE INVENTION

For those compositions containing lower levels of surfactants (i.e. about 20% or less), it can be difficult to solubilize perfume ingredients. When perfume ingredients are not sufficiently solubilized within a surfactant containing composition, there can be issues with stability and/or performance. For example, the composition can phase split with the insufficiently solubilized perfume coming out of the composition to form a separate phase. In addition, difficulty arises in proposing solutions to such issues as perfumes are made up of a variety of perfume ingredients with many of these ingredients having different solubility parameters. We have surprisingly found for those perfume ingredients with a carbon to oxygen ratio by number of atoms in the perfume ingredient of about 5:1 to about 20:1 and with a molecular weight of about 155 Daltons or more, a fatty acid of C8-10 chain length can be utilized to help solubilize such perfume ingredients in a surfactant containing composition.

As can be seen from Table 1, when several individual perfume ingredients are added to a surfactant containing composition (Comparative Example 1, below), at a level of 0.6% (substituting for the perfume in Comparative Example 1), Comparative Example 1 becomes cloudy. The cloudiness of the composition indicates the perfume ingredient is not sufficiently solubilized in the composition. The designation of "cloud" or "transparent" was made by visual observation, in that it was difficult to see through the sample or the sample presented a hazy or non-translucent appearance. Typically, a cloudy looking sample can have a measured transmittance of below 50%, for example 30%. Typically, a clear sample can have a measured transmittance of at least 70%, for example 80 or 90+%.

In Table 1, data points under C8-99 represent experiments run with varying levels of 99% pure octanoic acid. Data points under C8-10L represent experiments run with varying levels of a mixture of predominantly C8-10 chain length acids. It can be seen that acids in the C8-10 range are effective in delivering the benefit described herein.

TABLE 1

| | | Material % | | | | | |
|---|---|---|---|---|---|---|---|
| Perfume Raw | Comparative | C8-99 | | | C8-10L | | |
| Material | Formula 1 | 0.25 | 0.5 | 1.0 | 0.25 | 0.5 | 1.0 |
| Dihydromyrcenol | Cloud | Transparent | Transparent | Transparent | Transparent | Transparent | Transparent |
| hexyl cinnamic Aldehyde | Cloud | Cloud | Cloud | transparent | Cloud | Cloud | Transparent |

TABLE 1-continued

| Perfume Raw Material | Comparative Formula 1 | Material % C8-99 0.25 | 0.5 | 1.0 | C8-10L 0.25 | 0.5 | 1.0 |
|---|---|---|---|---|---|---|---|
| Methyl Nonyl Acetaldehyde | Cloud | Transparent | Transparent | Transparent | Transparent | Transparent | Transparent |
| Verdox | Cloud | Transparent | Transparent | Transparent | Transparent | Transparent | Transparent |
| Tetrahydrolinalool | Cloud | Cloud | Cloud | transparent | Cloud | Cloud | Transparent |
| methyl cedrylone | Cloud | Transparent | Transparent | Transparent | Transparent | Transparent | Transparent |
| Ionone Gamma methyl | Cloud | Transparent | Transparent | Transparent | Transparent | Transparent | Transparent |
| Flor Acetate | Cloud | Transparent | Transparent | Transparent | Transparent | Transparent | Transparent |
| pyranol | Cloud | Transparent | Transparent | Transparent | Transparent | Transparent | Transparent |
| Iso E Super | Cloud | Cloud | Cloud | Transparent | Cloud | Cloud | Transparent |
| Terpinyl Acetate | Cloud | Cloud | Transparent | Transparent | Cloud | Transparent | Transparent |

Table 1 also shows that some perfume ingredients are more difficult to solubilize than others with C8-C10 fatty acids. For example, dihydromyrcenol became transparent with the addition of only 0.25% of octanoic acid or the octanoic acid/decanoic acid blend, while hexyl cinnamic aldehyde was transparent at a level of 1.0%, but not 0.5%. Without being limited by theory, it is believed the octanoic acid, nonanoic acid, decanoic acid, or mixture thereof, can impact the type and/or shape of surfactant microstructures which exist in the product, leading to formation of microstructures more favorable to perfume ingredient solubilization.

In Table 2, the level of surfactant is varied in addition to the amount of octanoic acid, in order to understand the impact of surfactant on the level of octanoic acid needed to solubilize a perfume ingredient and whether there is a diminishing return upon its use in the composition. Four perfume ingredients were studied. These included hexyl cinnamic acid, ISO super E, terpinyl acetate, and tetrahydrolinalool at a level of 0.6%. To understand the potential surfactant impact, the formulation of Comparative Formula 1 was adjusted. For the 5.0% surfactant level, the amount of each surfactant in Comparative Formula 1 was cut in half (So, 1.4% SLS, 1.25 HLAS, and 2.35 C14-15EO7). For the higher surfactant levels, the amount of the surfactants in Comparative Formula 1 was adjusted accordingly (2× for 20%, etc.). The 0.6% perfume from Comparative Formula 1 was switched out with the perfume ingredient listed below. The amount of octanoic acid was varied as noted below with the adjustments being made in water to maintain the formulation at 100%. The octanoic acid used was 99% pure octanoic acid.

TABLE 2

| Surfactant Concentration | Nil OA | 0.25% OA | 0.5% OA | 1.0% OA | 2.0% OA | 3.0% OA | 5.0% OA |
|---|---|---|---|---|---|---|---|
| Hexyl Cinnamic Aldehyde | | | | | | | |
| 5.0% | Cloud | Cloud | Cloud | Cloud | Cloud | Cloud | Cloud |
| 10.0% | Cloud | Cloud | Cloud | Transparent | Cloud | Cloud | Cloud |
| 20.0% | Transparent | Transparent | Transparent | Transparent | Cloud | Cloud | Cloud |
| 30.0% | Transparent | Transparent | Transparent | Transparent | Transparent | Transparent | Transparent |
| ISO Super E | | | | | | | |
| 5.0% | Cloud | Cloud | Cloud | Transparent | Cloud | Cloud | Cloud |
| 10.0% | Cloud | Cloud | Cloud | Transparent | Cloud | Cloud | Cloud |
| 20.0% | Cloud | Transparent | Transparent | Transparent | Cloud | Cloud | Cloud |
| 30.0% | Transparent | Transparent | Transparent | Transparent | Transparent | Cloud | Cloud |
| Terpinyl acetate | | | | | | | |
| 5.0% | Cloud | Cloud | Transparent | Cloud | Cloud | Cloud | Cloud |
| 10.0% | Cloud | Cloud | Transparent | Transparent | Cloud | Cloud | Cloud |
| 20.0% | Cloud | Transparent | Transparent | Transparent | Cloud | Cloud | Cloud |
| 30.0% | Transparent | Transparent | Transparent | Transparent | Transparent | Cloud | Cloud |
| Tetrahyrdolinalool | | | | | | | |
| 5.0% | Cloud | Cloud | Cloud | Transparent | Cloud | Cloud | Transparent |
| 10.0% | Cloud | Cloud | Transparent | Transparent | Cloud | Cloud | Cloud |
| 20.0% | Transparent | Transparent | Transparent | Transparent | Cloud | Cloud | Cloud |
| 30.0% | Transparent | Transparent | Transparent | Transparent | Transparent | Transparent | Cloud |

From Table 2, compositions with about 30% of surfactant by weight can solubilize all 4 of the tested perfume ingredients at a level of 0.6% without the need of octanoic acid. However, it also shows that at a level of 20% surfactant, 2 of the perfume ingredients are not fully solubilized by the surfactant alone but can be solubilized with the addition of octanoic acid. In addition, at surfactant levels of 5% and 10%, none of the perfume ingredients are solubilized by the surfactant alone, but can, in some instances, be solubilized with the addition of octanoic acid.

Moreover, the impact of octanoic acid for solubilizing perfume does not appear to have a straightforward additive effect, instead having a diminishing return. For example, for perfume ingredient iso super e at a level of 0.6% in a composition with a surfactant level of 20%, 0.25%, 0.5%, and 1.0% by weight of octanoic acid gave a transparent composition, but the composition returned to cloudy at 2.0%. In addition, some perfume ingredient surfactant level combinations which sufficiently solubilized the perfume without octanoic acid, became cloudy upon the addition of certain levels of octanoic acid. This can be seen for terpinyl acetate in a 30% by weight surfactant composition which is clear without octanoic acid but is cloudy with a 3.0% addition of octanoic acid. This again, is likely due to the formation of surfactant microstructures which are better for the solubilization of perfume, however past a certain formulation percentage fatty acids, including C8-10 fatty acids, can cause cloudiness due to precipitation of the fatty acid out of the system and/or insufficient surfactant to maintain solubility.

Detergent Composition

As discussed above, a liquid detergent composition can include a surfactant, a perfume, and a C8-C10 fatty acid. The C8-C10 fatty acid can comprise octanoic acid, nonanoic acid, decanoic acid, or a combination thereof. The liquid detergent composition can be a laundry detergent composition. A liquid "laundry detergent composition" includes any composition intended for the cleaning of fabric in a washing machine or in a hand wash context. The liquid laundry detergent compositions can be used in high efficiency and standard washing machines, in addition to hand washing in a tub or basin for example.

The detergent composition may have a percent transmittance of about 70% or more. For example, the percent transmittance may be from about 70% to about 100%, from about 75% to about 100%, from about 80% to about 100%, from about 90% to about 100%, or about 95% to about 100%, or about 100%. The percent transmittance can be measured as noted below in the Methods section. The percent transmittance should be measured at the dominant wavelength of the product. In addition, materials which cause a detergent composition to be opaque which are not cloudiness causing perfume ingredients should be removed from the detergent composition or the detergent composition made without those ingredients in order to measure percent transmittance. Some ingredients which may cause or contribute to opaqueness in a detergent composition can include, for example, structurants, opacifiers, and encapsulates.

The detergent composition may be free of synthetic preservatives. Examples of synthetic preservatives include methylisothiazolinone and benzisothiazolinone.

Surfactant

The detergent composition may comprise from about 5% to about 20%, or about 5% to about 19%, or about 5% to about 18%, or about 5% to about 17%, or about 5% to about 16%, or about 5% to about 15%, or about 5% to about 12%, or about 5% to about 10%, by weight of the detergent composition of a surfactant.

The surfactant can have a ratio by weight to the C8-C10 fatty acid of about 200:1 to about 2:1, or from about 150:1 to about 2:1, or from about 100:1 to about 7:1, or from about 100:1 to about 10:1, or from about 50:1 to about 10:1. The surfactant may be anionic, nonionic, amphoteric, zwitterionic, or a combination thereof.

Anionic surfactants can include, for example, alkylbenezene sulfonate, methyl ester sulfonate, alkyl ether carboxylate, alkyl sulfate, alkylalkoxylated sulfate, or a combination thereof. The alkyl benzene sulfonate can comprise a linear alkylbenzene sulphonate. Linear alkylbenzene sulfonate, may have a small amount of branched alkylbenzene sulfonate as a byproduct of the manufacturing process, but this will generally be less than about 5%. The linear alkylbenzene sulphonate can be present, for example, at a level of 0.5% to about 20%, by weight of the liquid detergent composition. The linear alkyl benzene sulphonate can be selected from, for example, alkyl benzene sulfonic acids, alkali metal or amine salts of C10-16 alkyl benzene sulfonic acids, wherein the linear alkyl benzene sulphonate surfactant comprises greater than 50% C12, greater than 60%, greater than 70% C12, more preferably greater than 75%. The linear alkylbenzene sulphonate can comprise a $C_{10}$-$C_{16}$ alkyl benzene sulfonate, a $C_{11}$-$C_{14}$ alkyl benzene sulphonate, or a mixture thereof. The alkylbenzene sulphonate can be an amine neutralized alkylbenzene sulphonate, an alkali metal neutralized alkylbenzene sulphonate, or a mixture thereof. The amine comprises, for example, monoethanolamine, triethanolamine, monoisopropanolamine, or a mixture thereof. The alkali or alkali earth metal comprises, for example, sodium, potassium, magnesium, or a mixture thereof.

Another anionic surfactant comprises an alkyl sulphate anionic surfactant. The alkyl sulphate anionic surfactant can include, for example, alkyl sulphate, an alkoxylated alkyl sulphate, or a mixture thereof. The alkyl sulphate anionic surfactant may be a primary or a secondary alkyl sulphate anionic surfactant, or a mixture thereof, for example sodium lauryl sulfate. The alkoxylated alkyl sulphate can comprise an ethoxylated alkyl sulphate, propoxylated alkyl sulphate, a mixed ethoxylated/propoxylated alkyl sulphate, or a mixture thereof. An ethoxylated alkyl sulphate can have an average degree of ethoxylation of between 0.1 to 5, or between 0.5 and 3. The ethoxylated alkyl sulphate can have an average alkyl chain length of between 8 and 18, more preferably between 10 and 16, most preferably between 12 and 15. The alkyl portion of the ethoxylated alkyl sulphate may include, on average, from 13.7 to about 16 or from 13.9 to 14.6 carbons atoms. At least about 50% or at least about 60% of the AES molecule may include having an alkyl portion having 14 or more carbon atoms, from 14 to 18, or from 14 to 17, or from 14 to 16, or from 14 to 15 carbon atoms.

The alkyl ether carboxylate may be linear or branched. It may have an average carbon chain length of about 10 to about 26, about 10 to about 20, or about 16 to about 18. The alkyl ether carboxylate can have an average level of ethoxylation of about 2 to about 20, about 7 to about 13, about 8 to about 12, or about 9.5 to about 10.5. The acid form or salt form may be used. The alkyl chain may contain one cis or trans double bond. Commercial alkyl ether carboxylates are available, for example, from Kao (Akypo®), Huntsman (Empicol®), and Clariant (Emulsogen®).

The alkyl chain of the alkyl sulphate anionic surfactant can be linear, branched or a mixture thereof. A branched alkyl sulphate anionic surfactant can be a branched primary alkyl sulphate, a branched secondary alkyl sulphate, or a mixture thereof, preferably a branched primary alkyl sulphate, wherein the branching preferably is in the 2-position, or alternatively might be present further down the alkyl chain or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material, or a mixture thereof. Preferably, the synthetically derived material comprises oxo-synthesized material, Ziegler-synthesized material, Guerbet-synthesized material, Fischer-Tropsch-synthesized material, iso-alkyl synthesized material, or mixtures thereof, preferably oxo-synthesized material.

Branched 2-alkyl primary alkyl alcohol sulfates and 2-alkyl primary alkyl alcohol ethoxy sulfates having specific alkyl chain length distributions, can provide increased stain removal (particularly in cold water). 2-alkyl branched alcohols (and the 2-alkyl branched alkyl sulfates and 2-alkyl branched alkyl ethoxy sulfates and other surfactants derived from them) are positional isomers, where the location of the hydroxymethyl group (consisting of a methylene bridge ($—CH_2—$ unit) connected to a hydroxy (—OH) group) on the carbon chain varies. Thus, a 2-alkyl branched alkyl alcohol is generally composed of a mixture of positional isomers. Furthermore, it is well known that fatty alcohols, such as 2-alkyl branched alcohols, and surfactants are characterized by chain length distributions. In other words, fatty alcohols and surfactants are generally made up of a blend of molecules having different alkyl chain lengths (though it is possible to obtain single chain-length cuts). Notably, the 2-alkyl primary alcohols described herein, which may have specific alkyl chain length distributions and/or specific fractions of certain positional isomers, cannot be obtained by simply blending commercially available materials. Specifically, the distribution of from about 50% to about 100% by weight surfactants having m+n=11 is not achievable by blending commercially available materials.

The detergent composition can comprise a mixture of surfactant isomers of Formula I and surfactants of Formula II:

(I)

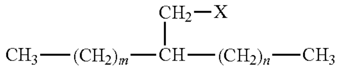

(II)

$$CH_3—(CH_2)_{m+n+3}—X$$

$6 \leq m \leq 11$;
$0 \leq n \leq 5$;

wherein from about 50% to about 100% by weight of the first surfactant are isomers having m+n=11; wherein from about 25% to about 50% of the mixture of surfactant isomers of Formula I have n=0; wherein from about 0.001% to about 25% by weight of the first surfactant are surfactants of Formula II; and wherein X is a hydrophilic moiety.

X can be, for example, neutralized with sodium hydroxide, potassium hydroxide, magnesium hydroxide, lithium hydroxide, calcium hydroxide, ammonium hydroxide, monoethanolamine, diethanolamine, triethanolamine, monoisopropanolamine, diamine, polyamine, primary amine, secondary amine, tertiary amine, amine containing surfactant, or a combination thereof.

X may be selected from sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonioalkanesulfonates, amidopropyl betaines, alkylated quats, alkyated/polyhydroxyalkylated quats, alkylated/polyhydroxylated oxypropyl quats, imidazolines, 2-yl-succinates, sulfonated alkyl esters, sulfonated fatty acids, and mixtures thereof.

The anionic surfactant may also be a biosurfactant. Anionic biosurfactants may include, for example, rhamnolipids. The rhamnolipid may have a single rhamnose sugar ring or two sugar rings.

The detergent composition may also comprise a non-ionic surfactant. The non-ionic surfactant may be, for example, an alkoxylated alcohol, wherein the alkoxylated alcohol is derived from a synthetic alcohol, a natural alcohol, or a mixture thereof. The alkoxylated alcohol can be a primary alkoxylated alcohol, a secondary alkoxylated alcohol, or a mixture thereof, preferably a primary alkoxylated alcohol. Preferably, the alkoxylated alcohol comprises ethoxylated alcohol, propoxylated alcohol, a mixed ethoxylated/propoxylated alcohol, or a mixture thereof, more preferably an ethoxylated alcohol. Alternatively, the alkoxylated alcohol might also include higher alkoxy groups such as butoxy groups. When mixed alkoxy groups, the alkoxy groups can be randomly ordered or present in blocks, preferably are present in blocks. For example, mixed ethoxy (EO)/propoxy (PO) groups might be ordered in EO/PO blocks, PO/EO blocks, EO/PO/EO blocks or PO/EO/PO blocks. Preferably, the ethoxylated alcohol has an average degree of ethoxylation of between 0.1 to 20, preferably between 5 and 15, most preferably between 6 and 10. The ethoxylated alcohol may have a broad alkoxy distribution, like Alfonic™ 1214-9 Ethoxylate, or a peaked narrow alkoxy distribution like that of Novel™ 1214-9, both materials are commercially available from Sasol™. If propoxylation is present, preferably the average degree of propoxylation is between 0.1 to 25, more preferably between 2 and 20, most preferably between 5 and 10.

Preferably, the alkoxylated alcohol has an average alkyl chain length of between 8 and 18, more preferably between 10 and 16, most preferably 12 and 15. Preferably, the alkyl chain of the alkoxylated alcohol is linear, branched or a mixture thereof, wherein the branched alkyloxylated alcohol is a branched primary alkoxylated alcohol, a branched secondary alkoxylated alcohol, or a mixture thereof, preferably a branched primary alkoxylated alcohol. Preferably, the weight average degree of branching of the alkoxylated alcohol is from 0% to 100% preferably from 0% to 95%, more preferably 0% to 60%, most preferably from 0% to 20%. The branching can be on the 2-alkyl position, or alternatively further down the alkyl chain, or can be multi-branched with individual branches spread over the alkyl chain.

Preferably, the synthetically derived material comprises oxo-synthesized material, Ziegler-synthesized material, Guerbet-synthesized material, Fischer-Tropsch-synthesized material, iso-alkyl branched materials, or mixtures thereof, preferably oxo-synthesized material. The liquid laundry detergent composition may comprise between 0.5% and 20%, preferably between 1% and 15%, more preferably between 3% and 12% by weight of the liquid laundry detergent composition of the non-ionic surfactant, preferably wherein the nonionic surfactant consists of the alkoxylated alcohol. Without wishing to be bound by theory, non-ionic surfactants, especially alkoxylated alcohol non-ionic surfactants provide the benefit of excellent body soil cleaning and soil suspension.

The detergent composition can also comprise an amphoteric surfactant and/or zwitterionic surfactant. Suitable amphoteric or zwitterionic surfactants include amine oxides, and/or betaines. Preferred amine oxides are alkyl dimethyl amine oxide or alkyl amidopropyl dimethyl amine oxide, more preferably alkyl dimethyl amine oxide and especially coco dimethyl amine oxide. Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N(R2)(R3) O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides.

Other suitable surfactants include betaines, such as alkyl betaines, alkylamidobetaine, amidazoliniumbetaine, sulfobetaine (sultaines) as well as phosphobetaines, or a combination thereof.

Perfume

The detergent composition also comprises a perfume. Perfume may be present, for example, at a level of about 0.2% to about 6.0%, or from about 0.2 to about 5.0%, or from about 0.2 to about 4%, or from about 0.2 to about 3%, or from about 0.2 to about 2.0%. Perfume comprises one or more perfume ingredients. The perfume ingredient includes at least one which is not fully solubilized by the surfactant in the detergent composition, these are cloudiness causing perfume ingredients. These cloudiness causing perfume ingredients can have a carbon to oxygen ratio by atoms in the molecule of about 5:1 to about 20:1, and may have a weight average molecular weight of 155 Daltons or more. For the cloudiness causing perfume ingredient, if an aromatic ring is present, it is in resonance with at least 2 other atoms that are not components of another ring. Cloudiness causing perfume ingredients comprise at least 10%, 20%, 25%, 30%, 35%, 40%, 45%, 50%, up to 100% of the perfume. Cloudiness causing perfume ingredients may be from 0.02% to about 6.0%, or from about 0.1% to about 6%, or from about 0.2% to about 6%, or from about 0.3% to about 6.0%, or from about 0.4% to about 6.0%, or from about 0.5% to about 6% or from about 0.6% to about 6.0%, by weight of the composition.

The cloudiness causing perfume ingredient may comprise, for example, dihydromyrcenol; hexyl cinnamic aldehyde; methyl nonyl acetaldehyde; ortho-tertiary butyl cyclohexyl acetate (tradename verdox); tetrahydrolinalool; methyl cedrylone; alpha iso methyl ionone; a,4,5,6,7,7a-hexahydro-4,7-methanoinden-6-yl acetate (tradename for for acetate); tetrahydro-2-isobutyl-4 methylpyran-4-ol (tradename pyranol), 7-acetyl, 1,2,3,4,5,6,7,8-octahydro-1, 1,6,7-tetramethyl naphthalene (tradename iso e super); terpinyl acetate; or a combination thereof. The cloudiness causing perfume ingredient does not comprise undecalactone.

Additional perfume ingredients may also be included in the perfume. These ingredients may or may not be solubilized by octanoic, nonanoic, decanoic acid, or mixtures thereof. Additional perfume ingredients may include, for example, Formic acid, methyl ester; Methane, 1,1'-thiobis-; Acetic acid ethyl ester; Propanoic acid, ethyl ester; Acetic acid, 2-methylpropyl ester; Butanoic acid, ethyl ester; 1-Butanol; Butanoic acid, 2-methyl-, ethyl ester; 1-Butanol, 3-methyl-, 1-acetate; Butanoic acid, 2-methyl-, 1-methylethyl ester; 2-Heptanone; 2-Hexenal, (2E)-; 1-Butanol, 3-methyl-; 2-Buten-1-ol, 3-methyl-, 1-acetate; 1, 3-Dioxolane-2-methanamine, N-methyl-; Bicyclo[3.1.1] hept-2-ene, 2, 6, 6-trimethyl-, (1R, 5R)—; Bicyclo[2.2.1] heptane, 2, 2-dimethyl-3-methylene-; 2-Butanethiol, 4-methoxy-2-methyl-; Pentanoic acid, 2-methyl-, ethyl ester; Bicyclo [3.1.1] heptane, 6, 6-dimethyl-2-methylene-; 1-Butanol, 3-methyl-, 1-propanoate; 1, 6-Octadiene, 7-methyl-3-methylene-; Octanal; 2H-Pyran, 2-ethenyltetrahydro-2, 6, 6-trimethyl-; 2-Octanone; Hexanoic acid, ethyl ester; 2-Oxabicyclo[2.2.2] octane, 1, 3, 3-trimethyl-; Benzene, 1-methyl-4-(1-methylethyl)-; Benzene, 1-methoxy-4-methyl-; 1, 3, 6-Octatriene, 3, 7-dimethyl-; Cyclohexene, 1-methyl-4-(1-methylethenyl)-; Cyclohexene, 1-methyl-4-(1-methylethenyl)-, (4R)—; 3-Octanone; Undecanal, 2-methyl-; Acetic acid, hexyl ester; 5-Hepten-2-one, 6-methyl-; 2-Hepten-4-one, 5-methyl-; 3-Hexen-1-ol, 1-acetate, (3Z)—; 3-Hexen-1-ol, 1-acetate; Propanoic acid, 2-hydroxy-, ethyl ester; Butanoic acid, 2-methylbutyl ester; Butanoic acid, 3-methylbutyl ester; 1, 4-Cyclohexadiene, 1-methyl-4-(1-methylethyl)-; Thiazole, 2-(2-methylpropyl)-; 3-Hexen ol, (3Z)—; Benzaldehyde; Butanoic acid, 3-oxo-, ethyl ester; 2-Hexen-1-ol, (2E)-; 2-Hexen-1-ol, (2Z)—; Cyclohexane, 3-ethoxy-1, 1, 5-trimethyl-, cis-(9CI); 2-Pentanone, 4-mercapto-4-methyl-; 2, 4, 6-Octatriene, 2, 6-dimethyl-, (4E, 6E)-; Oxirane, 2, 2-dimethyl-3-(3-methyl-2, 4-pentadien-1-yl)-; 4, 7-Octadienoic acid, methyl ester, (4E)-; Carbonic acid, (3Z)-3-hexen-1-yl methyl ester; Hexanoic acid, 2-propen-1-yl ester; 5-Heptenal, 2,6-dimethyl-; Heptanoic acid, ethyl ester; 3-Cyclohexene-1-carboxaldehyde, 2, 4-dimethyl-; Benzene, (2, 2-dimethoxyethyl)-; 2H-Pyran, tetrahydro-4-methyl-2-(2-methyl-1-propen-1-yl)-; 3-Nonanone; Benzonitrile; 3-Octanol; 1-Hexanol, 3, 5, 5-trimethyl-, 1-acetate; 4-Heptanol, 2, 6-dimethyl-, 4-acetate; Hexanoic acid, 2-methylpropyl ester; Propanoic acid, 2-methyl-, hexyl ester; Cyclohexanecarboxylic acid, 1, 4-dimethyl-, methyl ester, trans-; Benzeneacetaldehyde; Butanoic acid, 3-hydroxy-, ethyl ester; Propanedioic acid, 1, 3-diethyl ester; Benzoic acid, methyl ester; 1, 3, 5-Undecatriene; 4-Decenal, (4E)-; 1, 3-Dioxane, 2-butyl-4, 4, 6-trimethyl-; 2-Heptanol, 2, 6-dimethyl-; Ethanone, 1-phenyl-; Benzeneacetaldehyde, α-methyl-; Propanoic acid, 2-methyl-, 1, 3-dimethyl-3-buten-1-yl ester; 2, 6-Nonadienal, (2E, 6Z)—; Pyrazine, 2-methoxy-3-(2-methylpropyl)-; Formic acid, phenylmethyl ester; Benzene, 1-methoxy-4-propyl-; Cyclohexanone, 5-methyl-2-(1-methylethyl)-, (2R, 5R)-rel-; Cyclohexanone, 5-methyl-2-(1-methylethyl)-, (2R, 5S)-rel-; 2-Nonenal; Cyclohexanone, 2-ethyl-4, 4-dimethyl-; Benzene, 1, 4-dimethoxy-; Benzene, 1-(ethoxymethyl)-2-methoxy-; Bicyclo

[2.2.1] heptan-2-one, 1, 7, 7-trimethyl-; 2-Hexene, 6, 6-dimethoxy-2, 5, 5-trimethyl-; Decanal; Benzenepropanal, β-methyl-; Benzenemethanol, α-methyl-, 1-acetate; Acetic acid, nonyl ester; Ethanone, 1-(4-methylphenyl)-; 2H-Pyran, 6-butyl-3, 6-dihydro-2, 4-dimethyl-; Propanoic acid, 2-methyl-, (3Z)-3-hexen-1-yl ester; Benzoic acid, ethyl ester; 3-Octanol, 3, 7-dimethyl-, 3-acetate; 1-Hexanol, 5-methyl-2-(1-methylethyl)-, 1-acetate; Cyclohexanol, 3, 3, 5-trimethyl-, (1R, 5R)-rel-; 2-Hexenal, 5-methyl-2-(1-methylethyl)-; 7-Octen-2-ol, 2,6-dimethyl-; Acetic acid, phenylmethyl ester; Cyclohexanone, 2-(1-methylpropyl)-; 3-Octen-1-ol, (3Z)—; Heptanoic acid, 2-propen-1-yl ester; Benzenemethanol; Butanoic acid, 2-methyl-, hexyl ester; 2(3H)-Furanone, 5-ethyldihydro-; Cyclohexaneethanol, 1-acetate; 2-Nonenoic acid, methyl ester; Cyclohexanecarboxyli c acid, 2, 2-dimethyl-6-methylene-, methyl ester; Butanoic acid, (3Z)-3-hexen-1-yl ester; 2-Octynoic acid, methyl ester; 1, 3-Oxathiane, 2-methyl-4-propyl-, (2R, 4S)-rel-; Heptanal, 6-methoxy-2, 6-dimethyl-; Bicyclo[2.2.1] heptan-2-ol, 1, 3, 3-trimethyl-, 2-acetate; 1,6-Octadien-3-ol, 3,7-dimethyl-, 3-acetate; 2-Octanol, 2, 6-dimethyl-; 1-Octanol; 3-Cyclohexene-1-methanethiol, α, α, 4-trimethyl-; Cyclohexanemethanol, α, α, 4-trimethyl-, 1-acetate; Cyclohexanol, 2-(1,1-dimethylethyl)-, 1-acetate; Cyclohexanol, 4-(1,1-dimethylethyl)-, 1-acetate; Pyrazine, 2-methoxy-3-(1-methylpropyl)-; Cyclohexanol, 5-methyl-2-(1-methylethenyl)-, (1R, 2S, 5R)—; 2-Undecanone; or a combination thereof. Additional perfume ingredients may be found in US Pat. App. Pub Nos. 2003/0134772 and 2014/0170194.

C8-10 Fatty Acids

The detergent composition comprises a C8-C10 fatty acid. These are octanoic acid, nonanoic acid, and/or decanoic acid, or mixtures thereof. While some miniscule amounts of C8 and C10 fatty acid can be found in natural long chain fatty acids, like those derived from coconut oil, it is believed these miniscule amounts are not sufficient to achieve the desired effect. The C8-C10 fatty acids as discussed herein are predominantly C8, C9, or C10 or a combination of the C8-C10 is the predominant chain length in the material. The fatty acid or mixture of fatty acids can be present at a level of about 0.1% to about 3.0%, about 0.1% to about 2.5%, about 0.1% to about 2.0%, about 0.2% to about 2.0%, or about 0.25% to about 2.0%, by weight of the detergent composition. Octanoic acid is a saturated medium chain fatty acid with an 8-carbon backbone. It is a straight chain saturated fatty acid that is heptane in which one of the hydrogens of a terminal methyl group has been replaced by a carboxylic acid group. Octanoic acid is also known as caprylic acid. Nonanoic acid is a saturated medium chain fatty acid with a 9-carbon backbone. Decanoic acid is a saturated medium chain fatty acid with a 10-carbon backbone. To note, the chemical form of these acids can change as a function of product pH, in that they may exist in either a protonated state or a deprotonated state. It is within the scope of the present invention to include these acids in both protonated and deprotonated states.

Octanoic acid, nonanoic acid, and decanoic acid may be used as a predominantly pure mixture, meaning the specified acid composition has about 99% or more of the prescribed fatty acid. Furthermore, fatty acids can sometimes be purchased as mixtures, for example a C8/C10 blend from Procter and Gamble Chemicals, originating from palm or coconut oil. For example, a mixture can include a maximum of 6% C6, 53-60% C8, 34-42% C10, and a maximum of 2% C12. Fatty acids, even those which are predominantly pure can contain additional fatty acids as a result of the manufacturing process. The inclusion of these minor materials does not remove them from the scope of this invention.

Water

The detergent composition also includes water. Water can be present, for example, at a level of about 5% to about 95%, by weight of the composition.

pH

The detergent composition may have a pH of about 5.0 to about 12, preferably 6.0-10.0, more preferably from 8.0 to 10. wherein the pH of the detergent composition is measured as a 10% dilution in demineralized water at 20° C.

Adjunct Ingredients

The liquid detergent composition can comprise one or more adjunct ingredients. Adjunct ingredients can include, for example, color care agents; organic solvents; aesthetic dyes; hueing dyes; leuco dyes; opacifiers such as those commercially available under the Acusol tradename, brighteners including FWA49, FWA15, and FWA36; dye transfer inhibitors including PVNO, PVP and PVPVI dye transfer inhibitors; builders including citric acid- and fatty acids; chelants; enzymes; perfume capsules; preservatives; antioxidants including sulfite salts such as potassium sulphite or potassium bisulphite salts and those commercially available under the Ralox brand name; antibacterial and anti-viral agents including 4.4'-dichloro 2-hydroxydiphenyl ether such as Tinosan HP100 available from the BASF company; anti-mite actives such as benzyl benzoate; structuring agents including hydrogenated castor oil; silicone based anti-foam materials; electrolytes including inorganic electrolytes such as sodium chloride, potassium chloride, magnesium chloride, and calcium chloride, and related sodium, potassium, magnesium and calcium sulphate salts, as well as organic electrolytes such as sodium, potassium, magnesium and calcium salts of carbonate, bicarbonate, carboxylates such as formate, citrate and acetate; pH trimming agents including sodium hydroxide, hydrogen chloride, and alkanolamines including monoethanolamine, diethanolamine, triethanolamine, and monoisopropanolamine; a probiotic; a hygiene agent such as zinc ricinoleate, thymol, quaternary ammonium salts such as Bardac®, polyethylenimines (such as Lupasol® from BASF) and zinc complexes thereof, silver and silver compounds, a cationic biocide including octyl decyl dimethyl ammonium chloride, dioctyl dimethyl ammonium chloride, didecyl dimethyl ammonium chloride, dispersant, cleaning polymer, glucan, or a mixture thereof.

The organic solvent can include an alcohol and/or a polyol. For example, the organic solvent can comprise ethanol, propanol, isopropanol, a sugar alcohol, a glycol, a glycol ether, or a combination thereof. The organic solvent can comprise polyethylene glycol, especially low molecular weight polyethylene glycols such as PEG 200 and PEG 400; diethylene glycol; glycerol; 1,2-propanediol; polypropylene glycol including dipropylene glycol and tripropylene glycol and low molecular weight polypropylene glycols such as PPG400; or a mixture thereof.

The chelant can comprise, for example, EDDS, HEDP, GLDA, DTPA, DTPMP, DETA, EDTA, MGDA or a mixture thereof. The chelant can be biodegradable. Biodegradable chelants can include, for example, NTA, IDS, EDDG, EDDM, HIDS, HEIDA, HEDTA, DETA, or a combination thereof.

The enzyme can comprise, for example, protease, amylase, cellulase, mannanase, lipase, xyloglucanase, pectate lyase, nuclease enzyme, or a mixture thereof.

The composition may comprise one or more polymers. Examples are optionally modified carboxymethylcellulose, modified polyglucans, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from 0.005 to 10 wt %, generally from 0.5 to 8 wt %.

The composition may comprise a zwitterionic polyamine that is a modified hexamethylenediamine. The modification of the hexamethylenediamine includes: (1) one or two alkoxylation modifications per nitrogen atom of the hexamethylenediamine. The alkoxylation modification consisting of the replacement of a hydrogen atom on the nitrogen of the hexamethylenediamine by a (poly)alkoxylene chain having an average of about 1 to about 40 alkoxy moieties per modification, wherein the terminal alkoxy moiety of the alkoxylene chain is capped with hydrogen, a C1-C4 alkyl, sulfates, carbonates, or mixtures thereof; (2) a substitution of one C1-C4 alkyl moiety and one or two alkoxylation modifications per nitrogen atom of the hexamethylenediamine. The alkoxylation modification consisting of the replacement of a hydrogen atom by a (poly)alkoxylene chain having an average of about 1 to about 40 alkoxy moieties per modification wherein the terminal alkoxy moiety of the alkoxylene chain is capped with hydrogen, a C1-C4 alkyl or mixtures thereof; or (3) a combination thereof.

Other suitable polymers include amphiphilic graft copolymers. Preferred amphiphilic graft co-polymer(s) comprise (i) polyethyelene glycol backbone; and (ii) and at least one pendant moiety selected from polyvinyl acetate, polyvinyl alcohol and mixtures thereof. An example of amphiphilic graft co-polymer is Sokalan HP22, supplied from BASF. Other suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and less than or equal to 1 grafting point per 50 ethylene oxide units. Typically, these are incorporated into the compositions of the invention in amounts from 0.005 to 10 wt %, more usually from 0.05 to 8 wt %.

The composition may comprise one or more soil release polymers. Examples include soil release polymers having a structure as defined by one of the following Formula (VI), (VII) or (VIII):

$$—[(OCHR^1—CHR^2)_a—O—OC—Ar—CO-]_d \quad \text{(VI)}$$

$$—[(OCHR^3—CHR^4)_b—O—OC\text{-sAr-}CO-]_e \quad \text{(VII)}$$

$$—[(OCHR^5—CHR^6)_c—OR^7]_f \quad \text{(VIII)}$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN260, SRN300 and SRN325 supplied by Clariant. Other suitable soil release polymers are Marloquest polymers, such as Marloquest SL supplied by Sasol.

Known polymeric soil release agents, hereinafter "SRA" or "SRA's", can optionally be employed in the present detergent compositions. If utilized, SRA's will generally comprise from 0.01% to 10.0%, typically from 0.1% to 5%, preferably from 0.2% to 3.0% by weight, of the composition.

SRA's can include, for example, a variety of charged, e.g., anionic or even cationic (see U.S. Pat. No. 4,956,447), as well as noncharged monomer units and structures may be linear, branched or even star-shaped. Examples of SRAs are described in U.S. Pat. Nos. 4,968,451; 4,711,730; 4,721,580; 4,702,857; 4,877,896; 3,959,230; 3,893,929; 4,000,093; 5,415,807; 4,201,824; 4,240,918; 4,525,524; 4,201,824; 4,579,681; and 4,787,989.

The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Alternatively, these materials may comprise polyacrylates having one ethoxy side-chain per every 7-8 acrylate units. The side-chains are of the formula $—(CH_2CH_2O)_m (CH_2)_nCH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Such carboxylate-based polymers can advantageously be utilized at levels from about 0.1% to about 7%, by weight, in the compositions herein. Suitable polymeric dispersing agents include carboxylate polymer such as a maleate/acrylate random copolymer or polyacrylate homopolymer. Preferably the carboxylate polymer is a polyacrylate homopolymer having a molecular weight of from 4,000 Daltons to 9,000 Daltons, or maleate/acrylate copolymer with a molecular weight 60,000 Daltons to 80,000 Daltons. Polymeric polycarboxylates and polyethylene glycols, can also be used. Polyalkylene glycol-based graft polymer may prepared from the polyalkylene glycol-based compound and the monomer material, wherein the monomer material includes the carboxyl group-containing monomer and the optional additional monomer(s). Optional additional monomers not classified as a carboxyl group-containing monomer include sulfonic acid group-containing monomers, amino group-containing monomers, allylamine monomers, quaternized allylamine monomers, N vinyl monomers, hydroxyl group-containing monomers, vinylaryl monomers, isobutylene monomers, vinyl acetate monomers, salts of any of these, derivatives of any of these, and mixtures thereof.

The composition may comprise alkoxylated polyamines. Such materials include but are not limited to ethoxylated polyethyleneimine, ethoxylated hexamethylene diamine, and sulfated versions thereof. Polypropoxylated derivatives are also included. A wide variety of amines and polyaklyeneimines can be alkoxylated to various degrees, and optionally further modified to provide the abovementioned benefits. A useful example is 600 g/mol polyethyleneimine core ethoxylated to 20 EO groups per NH. A preferred ethoxylated polyethyleneimine is PE-20 available from BASF.

Useful alkoxylated polyamine based polymers include the alkoxylated polyethylene imine type where said alkoxylated polyalkyleneimine has a polyalkyleneimine core with one or more side chains bonded to at least one nitrogen atom in the polyalkyleneimine core, wherein said alkoxylated polyalkyleneimine has an empirical formula (I) of $(PEI)_a$-$(EO)_b$—$R_1$, wherein a is the average number-average molecular weight ($MW_{PEI}$) of the polyalkyleneimine core of the alkoxylated polyalkyleneimine and is in the range of from 100 to 100,000 Daltons, wherein b is the average degree of ethoxylation in said one or more side chains of the alkoxylated polyalkyleneimine and is in the range of from 5 to 40, and wherein $R_1$ is independently selected from the group consisting of hydrogen, $C_1$-$C_4$ alkyls, and combinations thereof.

Other suitable alkoxylated polyalkyleneimine include those wherein said alkoxylated polyalkyleneimine has a polyalkyleneimine core with one or more side chains bonded to at least one nitrogen atom in the polyalkyleneimine core, wherein the alkoxylated polyalkyleneimine has an empirical formula (II) of $(PEI)_o$-$(EO)_m(PO)_n$—$R_2$ or $(PEI)_o$—$(PO)_n(EO)_m$—$R_2$, wherein o is the average number-average molecular weight ($MW_{PEI}$) of the polyalkyleneimine core of the alkoxylated polyalkyleneimine and is in the range of from 100 to 100,000 Daltons, wherein m is the average degree of ethoxylation in said one or more side chains of the alkoxylated polyalkyleneimine which ranges from 10 to 50, wherein n is the average degree of propoxylation in said one or more side chains of the alkoxylated polyalkyleneimine which ranges from 1 to 50, and wherein $R_2$ is independently selected from the group consisting of hydrogen, $C_1$-$C_4$ alkyls, and combinations thereof.

Cellulosic polymers may be used according to the invention. Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof. Suitable carboxymethyl celluloses have a degree of carboxymethyl substitution from 0.5 to 0.9 and a molecular weight from 100,000 Da to 300,000 Da. Suitable carboxymethyl celluloses have a degree of substitution greater than 0.65 and a degree of blockiness greater than 0.45, e.g. as described in WO09/154933.

The consumer products of the present invention may also include one or more cellulosic polymers including those selected from alkyl cellulose, alkylalkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da. Examples of carboxymethylcellulose polymers are Carboxymethyl cellulose commercially sold by CPKelko as Finnfix®GDA, hydrophobically modified carboxymethyl cellulose, for example the alkyl ketene dimer derivative of carboxymethylcellulose sold commercially by CPKelco as Finnfix®SH1, or the blocky carboxymethylcellulose sold commercially by CPKelco as Finnfix®V.

Cationic polymers may also be used according to the invention. Suitable cationic polymers will have cationic charge densities of at least 0.5 meq/gm, in another embodiment at least 0.9 meq/gm, in another embodiment at least 1.2 meq/gm, in yet another embodiment at least 1.5 meq/gm, but in one embodiment also less than 7 meq/gm, and in another embodiment less than 5 meq/gm, at the pH of intended use of the composition, which pH will generally range from pH 3 to pH 9, in one embodiment between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, in one embodiment between 50,000 and 5 million, and in another embodiment between 100,000 and 3 million.

Suitable cationic polymers for use in the compositions herein can contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Especially useful cationic polymers which may be used include wherein said cationic polymer comprises a polymer selected from the group consisting of cationic celluloses, cationic guars, poly(acrylamide-co-diallyldimethylammonium chloride), poly(acryl amide-co-diallyldimethylammonium chloride-co-acrylic acid), poly(acrylamide-co-methacryloamidopropyl-pentamethyl-1,3-propyl ene-2-ol-ammonium dichloride), poly(acrylamide-co-N,N-dimethylaminoethyl acrylate) and its quaternized derivatives, poly(acrylamide-co-N,N-dimethylaminoethyl methacrylate) and its quaternized derivatives, poly(acrylamide-methacrylamidopropyltrimethyl ammonium chloride), poly(acrylamide-methacrylamidopropyltrimethyl ammonium chloride-co-acrylic acid), poly(diallyldimethyl ammonium chloride), poly(diallyldimethylammonium chloride-co-acrylic acid), poly(ethyl methacrylate-co-oleyl methacrylate-co-di ethylaminoethyl methacrylate) and its quaternized derivatives, poly(ethyl methacrylate-co-dimethylaminoethyl methacrylate) and its quaternized derivatives, poly(hydroxpropylacrylate-co-methacrylamidopropyltrimethylammonium chloride) and its quaternized derivatives, poly(hydroxyethylacrylate-co-dimethyl aminoethyl methacrylate) and its quaternized derivatives, poly(methylacrylamide-co-dimethylaminoethyl acrylate) and its quaternized derivatives, poly(methacrylate-co-methacrylamidopropyltrimethyl ammonium chloride), poly(vinylformamide-co-acrylic acid-co-diallyldimethylammonium chloride), poly (vinylformamide-co-diallyldimethylammonium chloride), poly(vinylpyrrolidone-co-acrylamide-co-vinyl imidazole) and its quaternized derivatives, poly(vinylpyrrolidone-co-dimethylaminoethyl methacrylate) and its quaternized derivatives, poly(vinylpyrrolidone-co-methacrylamide-co-vinyl imidazole) and its quaternized derivatives, poly(vinylpyrrolidone-co-vinyl imidazole) and its quaternized derivatives, polyethyleneimine and including its quaternized derivatives, and mixtures thereof.

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418; 3,958,581; and U.S. Publication No. 2007/0207109A1.

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. The dye control agent may be selected from (i) a sulfonated phenol/formaldehyde polymer; (ii) a urea derivative; (iii) polymers of ethylenically unsaturated monomers, where the polymers are molecularly imprinted with dye; (iv) fibers consisting of water-insoluble polyamide, wherein the fibers have an average diameter of not more than about 2 μm; (v) a polymer obtainable from polymerizing benzoxazine monomer compounds; and (vi) combinations thereof. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Examples of water soluble polymers include but are not limited to polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof.

The composition may comprise a fabric shading agent. Suitable fabric shading agents include dyes, dye-clay conjugates, and pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Preferred dyes include alkoxylated azothiophenes, Solvent Violet 13, Acid Violet 50 and Direct Violet 9.

Encapsulates

A composition can comprise an encapsulate. The composition may comprise, for example, from about 0.05% to about 5%, or from about 0.05% to about 5%, or from about 0.1% to about 5%, or from about 0.2% to about 2%, by weight of the composition, of encapsulates. The composition may comprise a sufficient amount of encapsulates to provide from about 0.05% to about 10%, or from about 0.1% to about 5%, or from about 0.1% to about 2%, by weight of the composition, of perfume to the composition. The encapsulate comprises a shell and a core. The core may be surrounded by the shell.

When discussing herein the amount or weight percentage of the encapsulates, it is meant the sum of the shell material and the core material.

The encapsulates may have a volume weighted median encapsulate size from about 0.5 microns to about 100 microns, or even 10 to 100 microns, preferably from about 1 micron to about 60 microns, or even 10 microns to 50 microns, or even 20 microns to 45 microns, or alternatively 20 microns to 60 microns.

Core

The core may comprise a perfume. The perfume may comprise a single perfume raw material or a mixture of perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The perfume in the core may contain a mixture of perfume raw materials. The perfume in the core may comprise at least three, or at least four, or at least five, or at least six, or at least seven, or at least eight, or at least nine, or at least ten perfume raw materials. A mixture of perfume raw materials may provide more complex and desirable aesthetics, and/or better perfume performance or longevity, for example at a variety of touchpoints.

It may be that the perfume in the core comprises less than about fifty, or less than about forty, or less than about thirty, or less than about twenty-five, or less than about twenty perfume raw materials. It may be desirable to limit the number of perfume raw materials in the perfume as a way to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core of the encapsulates of the present disclosure may comprise a partitioning modifier. The core may comprise, in addition to the encapsulated benefit agent, from greater than 0% to about 80%, preferably from greater than 0% to about 50%, more preferably from greater than 0% to about 30%, most preferably from greater than 0% to about 20%, based on total core weight, of a partitioning modifier.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soybean oil. US Patent Application Publication 20110268802, incorporated herein by reference, describes other partitioning modifiers that may be useful in the presently described perfume encapsulates.

Shell

The encapsulates may comprise a shell. The shell may, partially or completely, surround the core. The wall material may include an aminoplast. The aminoplast may include a polyurea, polyurethane, and/or polyurea urethane. The aminoplast may include an aminoplast copolymer, such as melamine-formaldehyde, urea-formaldehyde, cross-linked melamine formaldehyde, or mixtures thereof. The wall may include melamine formaldehyde, which may further include a coating as described below. The encapsulate may include a core that comprises perfume, and a wall that includes melamine formaldehyde and/or cross linked melamine formaldehyde. The encapsulate may include a core that comprises perfume, and a wall that comprises melamine formaldehyde and/or cross-linked melamine formaldehyde, poly(acrylic acid) and poly(acrylic acid-co-butyl acrylate).

The shell may comprise a polymeric material. The polymeric material may comprise a (meth)acrylate material. As described above, perfumes having an acid value of greater than 5.0 mg KOH/g have been found to perform surprisingly well when encapsulated in a shell comprising an acrylate material. The polymeric material of the shell may be formed, at least in part, by a radical polymerization process.

The acrylate material of the shell may include a (meth) acrylate material selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth) acrylate, polyethylene glycol di(meth)acrylate and dipropylene glycol di(meth)acrylate and various multifunctional (meth)acrylates. Monofunctional acrylates, i.e., those containing only one acrylate group, may also be advantageously used. Typical monoacrylates include 2-ethylhexyl (meth)acrylate, 2-hydroxyethyl (meth)acrylate, cyanoethyl (meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

The main said shell material may comprise polyacrylate. The shell material may include from about 25% to about 100%, or from about 50% to about 100%, or from about 65% to about 100%, by weight of the shell material, of a polyacrylate polymer. The polyacrylate may include a polyacrylate cross linked polymer.

The (meth)acrylate material of the encapsulates may include a polymer derived from a material that comprises one or more multifunctional acrylate moieties. The multifunctional acrylate moiety may be selected from the group consisting of tri-functional acrylate, tetra-functional acrylate, penta-functional acrylate, hexa-functional acrylate, hepta-functional acrylate and mixtures thereof. The multifunctional acrylate moiety is preferably hexa-functional acrylate. The acrylate material may include a polyacrylate that comprises a moiety selected from the group consisting of an acrylate moiety, methacrylate moiety, amine acrylate moiety, amine methacrylate moiety, a carboxylic acid acrylate moiety, carboxylic acid methacrylate moiety, and combinations thereof, preferably an amine methacrylate or carboxylic acid acrylate moiety.

The (meth)acrylate material may include a material that comprises one or more multifunctional acrylate and/or multifunctional methacrylate moieties. The ratio of material that comprises one or more multifunctional acrylate moieties to material that comprises one or more methacrylate moieties may be from about 999:1 to about 6:4, preferably from about 99:1 to about 8:1, more preferably from about 99:1 to about 8.5:1.

Examples of multifunctional acrylates include commercial materials from Sartomer Inc., such as CN975 (a hexafunctional aromatic urethane acrylate), CN9006 (a hexafunctional aliphatic urethane acrylate), CN296, CN293, CN2295 (a hexafunctional polyester acrylate oligomer or acrylated polyester), CN2282, CN294E, CN299 (a tetrafunctional polyester acrylate oligomer or acrylated polyester), SR494, SR295, SR255 (a tetrafunctional acrylate oligomer), SR9009, SR9011 (a trifunctional methacrylate oligomer), SR929 (a polyester urethane acrylate oligomer), SR9053 (an acid ester trifunctional acrylate oligomer), CN989, CN9301 (an aliphatic urethane acrylate), SR350, SR353 (a trifunctional acrylate oligomer), SR9012 (a trifunctional acrylate ester), and/or SR368 (a tris (2-hydroxyethyl)isocyanurate triacrylate).

The acrylate material may be derived from a monomer selected from a hexafunctional acrylate, a triacrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof, as such materials have been found to be useful in making robust capsules.

The shells of the particles described herein may comprise a poly(meth)acrylate polymer comprising a reaction product of at least one monomer or oligomer thereof. The monomer comprises a structure according to Formula I:

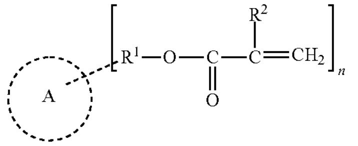

wherein $R^1$ is selected from $C_1$ to $C_8$, $R^2$ is hydrogen or methyl, wherein n is an integer from 1 to 3, and A is a ring structure selected from any of those selected from Formulas II-VI:

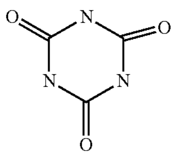

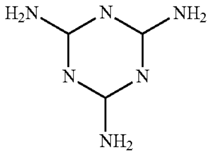

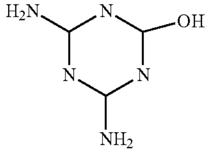

V

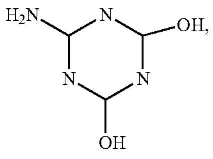

and/or

VI

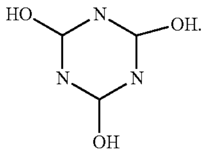

The shell of the encapsulates may be substantially free of melamine derivatives. Melamine derivatives may include polymers or other material that are derived from melamine-based monomers, for example melamine-formaldehyde material. The shell of the encapsulates may be substantially free of melamine-formaldehyde material.

The encapsulate, based on total encapsulate weight, may comprise from about 0.5% to about 40%, more preferably 0.8% to 5% of an emulsifier. Emulsifiers may be useful as processing aids during formation of the encapsulates. The emulsifier may be embedded in and/or located on the shell. The emulsifier may be selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water.

The emulsifier preferably comprises polyvinyl alcohol. Preferably, the polyvinylalcohol has at least one the following properties, or a mixture thereof: (i) a hydrolysis degree from 70% to 99%, preferably 75% to 98%, more preferably from 80% to 96%, more preferably from 82% to 96%, most preferably from 86% to 94%; and/or (ii) a viscosity of from 2 mPa·s to 150 mPa·s, preferably from 3 mPa·s to 70 mPa·s, more preferably from 4 mPa·s to 60 mPa·s, even more preferably from 5 mPa·s to 55 mPa·s in 4% water solution at 20° C. Suitable polyvinylalcohol materials may be selected from Selvol 540 PVA (Sekisui Specialty Chemicals, Dallas, TX), Mowiol 18-88=Poval 18-88, Mowiol 3-83, Mowiol 4-98=Poval 4-98 (Kuraray), Poval KL-506=Poval 6-77 KL (Kuraray), Poval R-1130=Poval 25-98 R (Kuraray), Gohsenx K-434 (Nippon Gohsei).

The encapsulates of the present disclosure may comprise a coating. The shell may comprise the coating; for example, the coating may be on an outer surface of the shell. The encapsulates may be manufactured and be subsequently coated with a coating material. The coating may be useful as a deposition aid. Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise chitosan.

The compositions may comprise encapsulates according to the present disclosure wherein at least 75% of the encapsulates have an encapsulate shell thickness of from about 10 nm to about 350 nm, from about 20 nm to about 200 nm, or from 25 nm to about 180 nm, as determined by the Encapsulate Shell Thickness test method described herein.

Methods of Solubilizing Perfume Ingredients

In addition to the compositional components discussed above the present disclosure is also directed to a method of solubilizing one or more perfume ingredients in a surfactant containing composition. This method can comprise combining the perfume ingredient with a C8-C10 fatty acid, wherein the perfume ingredient has a carbon to oxygen ratio by number of atoms of about 5:1 to about 20:1 and the molecular weight of the perfume ingredient is about 155 Daltons or higher, and wherein the ratio by weight of surfactant to C8-C10 fatty acid is from about 200:1 to about 2:1 and the surfactant containing composition has a percent transmittance of at least 70%. The perfume ingredient can comprise dihydromyrcenol, hexyl cinnamic aldehyde, methyl nonyl acetaldehyde, verdox, tetrahydrolinalool, methyl cedrylone, ionone gamma methyl, for acetate, pyranol, iso e super, terpinyl acetate, or a combination thereof. The composition can comprise from about 5% to about 20% by weight of the surfactant. The composition can comprise from about 0.1% to about 3% by weight of the C8-C10 fatty acid. If the perfume ingredient includes an aromatic ring, the aromatic ring is in resonance with at least 2 other atoms that are not components of another ring. The C8-C10 fatty acid can comprise octanoic acid, nonanoic acid, decanoic acid, or a combination thereof. The transmittance can be measured at the dominant wavelength of the product and in the absence of opacifiers, structurants, and encapsulates. While only a few of the compositional components and attributes are listed here for brevity, it is envisioned any of those discussed above could be utilized in this method.

Combinations

1. A liquid detergent composition comprising:
   a) from about 5% to about 20%, by weight of the composition, of surfactant;
   b) from about 0.1% to about 3%, preferably about 0.25% to about 2.0%, by weight of the composition, of a C8-C10 fatty acid comprising octanoic acid, nonanoic acid, decanoic acid, or a combination thereof, wherein the ratio of surfactant to C8-C10 fatty acid by weight ranges from about 200:1 to about 2:1; and
   c) a perfume comprising a perfume ingredient which has a carbon to oxygen ratio by number of atoms of about 5:1 to about 20:1 and the molecular weight of the perfume ingredient is about 155 Daltons or higher;

wherein the liquid detergent composition has a percent transmittance of at least 70%, wherein the transmittance is measured at the dominant wavelength of the liquid detergent composition and in the absence of opacifiers, structurants, and encapsulates.
2. The liquid detergent composition of 1, wherein the composition comprises from about 0.2% to about 5.0%, by weight of the composition of the perfume.
3. The liquid detergent composition of any of 1 or 2, wherein the surfactant comprises an anionic surfactant.
4. The liquid detergent composition of any of 1-3, wherein the perfume has about 10% or more by weight of the perfume of the perfume ingredient which has a carbon to oxygen ratio of about 5:1 to about 20:1 by number of atoms and the molecular weight of the perfume ingredient is about 155 Daltons or higher.
5. The liquid detergent composition of any of 1-4, wherein the perfume is free of undecalactone.
6. The liquid detergent composition of any of 1-5, wherein the perfume ingredient comprises dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof.
7. The liquid detergent composition of any of 1-6, wherein the surfactant comprises a combination of anionic surfactant and nonionic surfactant.
8. The liquid detergent composition of any of 1-7, wherein if the perfume ingredient includes an aromatic ring the aromatic ring is in resonance with at least 2 other atoms that are not components of another ring.
9. The liquid detergent composition of any of 1-8, wherein the composition is free of synthetic preservative.
10. The liquid detergent composition of any of 1-9, wherein the composition has a diluted pH of about 6 to about 10.
11. The liquid detergent composition of any of 1-10, wherein the C8-C10 fatty acid comprises octanoic acid, nonanoic acid, decanoic acid, or a combination thereof.
12. A liquid detergent composition, comprising:
    a) from about 5% to about 20% by weight of the composition of a surfactant comprising an anionic surfactant;
    b) from about 0.2% to about 4% by weight of the composition of a perfume comprising a perfume ingredient comprising dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof, wherein the perfume ingredient comprises 10% or more by weight of the perfume; and
    c) from about 0.1% to about 3%, preferably from about 0.25% to about 2.0%, by weight of the composition of a C8-C10 fatty acid comprising octanoic acid, nonanoic acid, decanoic acid, or a combination thereof wherein the composition has a transmittance of at least 70%.
13. The liquid detergent composition of 12, wherein the ratio by weight of the surfactant to the C8-C10 fatty acid is from about 200:1 to about 2:1.
14. The liquid detergent composition of any of 1-13, wherein the perfume has about 10%, 20%, 30%, 40%, 50% or more by weight of the perfume of the perfume ingredient.
15. The liquid detergent composition of any of 12-14, wherein the perfume ingredient which has a carbon to oxygen ratio of about 5:1 to about 20:1 by number of atoms and the molecular weight of the perfume ingredient is about 155 Daltons or higher.
16. The liquid detergent composition of any of 12-15, wherein the perfume is free of undecalactone.
17. The liquid detergent composition of any of 12-16, wherein the surfactant comprises a combination of anionic surfactant and nonionic surfactant.

18. The liquid detergent composition of any of 12-17, wherein if the perfume ingredient includes an aromatic ring the aromatic ring is in resonance with at least 2 other atoms that are not components of another ring.
19. The liquid detergent composition of any of 12-18, wherein the composition is free of synthetic preservative.
20. The liquid detergent composition of any of 12-20, wherein the composition has a diluted pH of about 6 to about 10.
21. The liquid detergent composition of any of 12-20, wherein the C8-C10 fatty acid comprises octanoic acid, nonanoic acid, decanoic acid, or a combination thereof.
22. The liquid detergent composition of any of 12-21, wherein the transmittance is measured at the dominant wavelength of the liquid detergent composition.
23. The liquid detergent composition of any of 12-22, wherein the transmittance is measured in the absence of structurant, encapsulate, and opacifier.
24. The liquid detergent composition of any of 1-23, wherein the C8-C10 fatty acid comprises octanoic acid, decanoic acid, or a combination thereof.
24b. A method of solubilizing one or more perfume ingredients in a surfactant containing composition comprising:
combining the perfume ingredient with a C8-C10 fatty acid, wherein the perfume ingredient has a carbon to oxygen ratio by number of atoms of about 5:1 to about 20:1 and the molecular weight of the perfume ingredient is about 155 Daltons or higher, and wherein the ratio by weight of surfactant to C8-C10 fatty acid is from about 200:1 to about 2:1 and the surfactant containing composition has a percent transmittance of at least 70%.
25. The method of 24b, wherein the perfume ingredient comprises dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof.
26. The method of any of 24b-25, wherein the composition comprises from about 5% to about 20% by weight of the surfactant.
27. The method of any of 24b-26, wherein the composition comprises from about 0.1% to about 3%, preferably about 0.25% to about 2.0%, by weight of the C8-C10 fatty acid.
28. The method of any of 24b-27, wherein if the perfume ingredient includes an aromatic ring the aromatic ring is in resonance with at least 2 other atoms that are not components of another ring.
29. The method of any of 24b-28, wherein the C8-C10 fatty acid comprises octanoic acid, nonanoic acid, decanoic acid, or a combination thereof.
30. The method of any of 24b-29, wherein the composition is free of synthetic preservative.
31. The method of any of 24b-30, wherein the perfume has about 10%, 20%, 30%, 40%, 50%, or more by weight of the perfume of the perfume ingredient.
32. The method of any of 24b-31, wherein the perfume further comprises an additional perfume ingredient.
33. The method of any of 24b-32, wherein the transmittance is measured at the dominant wavelength of the liquid detergent composition.
34. The method of any of 24b-33, wherein the transmittance is measured in the absence of structurant, encapsulate, and opacifier.
35. Use of a C8-C10 fatty acid to solubilize a perfume ingredient.
36. The use of 35, wherein the perfume ingredient has a carbon to oxygen ratio by number of atoms of about 5:1 to about 20:1 and the molecular weight of the perfume ingredient is about 155 Daltons or higher.
37. The use of any of 35-36, wherein the perfume ingredient comprises dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof.
38. The use of any of 35-37, wherein the C8-C10 fatty acid comprises octanoic acid, nonanoic acid, decanoic acid, or a combination thereof.
39. The use of any of 35-38, wherein the C8-C10 fatty acid comprises octanoic acid.

Test Methods

Method of Measuring Transmittance

To determine the total transmittance samples can be analyzed using the HunterLab UltraScan VIS Spectrophotometer. Prior to use, the spectrophotometer is standardized following the manufacturer's instructions (UltraScan VIS Supplemental Manual for EasyMatch QC ver2.0). For each composition evaluated, 50 ml of product is added into a canted neck cell culture flask (10 CellStar®, Greiner Bio-one, 690175). The outside surfaces of the sample container are cleaned with a lint free wipe (Kimtech Science™ Kimwipes™, VWR 89218-057). The sample container is placed into the transmittance compartment and the EasyMatch® QC software is initiated. The predominate wavelength is determined by the spectrophotometer software based on the color of the product sample and overall % T is obtained. If the predominant wavelength of the product is unavailable or unmeasurable, the product can be made without dye, Liquitint Blue AH dye (Milliken & Company) can be added to the product at a level of 0.05% and the transmittance measured at 476 nm. For the samples tested below the Liquitint® Blue AH dye (Milliken & Company) produced a predominate wavelength of approximately 476 nm, so transmission was measured at that wavelength Where the sample contains materials which opacify it other than the perfume, for example structurants, encapsulates, or opacifiers, the transmittance of the sample should be measured on a version of the sample which does not contain those ingredients.

EXAMPLES

Comparative Example 1

| MATERIAL | Wt. % in Composition |
|---|---|
| sodium lauryl sulfate (SLS) | 2.8 |
| Linear alkyl benzene sulfonic acid (HLAS) | 2.5 |
| C14-C15 Nonionic alcohol polyethylene glycol ether with an average degree of ethoxylation of 7 (C14-15EO7) | 4.7 |

-continued

| MATERIAL | Wt. % in Composition |
|---|---|
| Octanoic Acid | — |
| perfume | 0.6 |
| borate | 1.4 |
| GLDA (N,N-Dicarboxymethyl glutamic acid tetrasodium salt) | 0.62 |
| Misc (chelant, salt, viscosity modifier, pH modifier, brightener, dye, etc.) | 5.69 |
| Water | 82.29 |
| Total Surfactant | 10 |
| pH | 8.3 |

The following comparative examples show examples of perfume ingredients that do not cause the product to become cloudy:

| | Comp. Example 2 | Comp. Example 3 | Comp. Example 4 | Comp. Example 5 | Comp. Example 6 | Comp. Example 7 |
|---|---|---|---|---|---|---|
| SLS | 2.8 | 2.8 | 2.8 | 2.8 | 2.8 | 2.8 |
| HLAS | 2.5 | 2.5 | 2.5 | 2.5 | 2.5 | 2.5 |
| C14-15EO7 | 4.7 | 4.7 | 4.7 | 4.7 | 4.7 | 4.7 |
| Perfume | $0.6^A$ | $0.68^B$ | $0.6^C$ | $0.6^D$ | $0.6^E$ | $0.6^F$ |
| Octanoic acid | — | — | — | — | — | — |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.69 | 5.69 | 5.69 | 5.69 | 5.69 | 5.69 |
| Water | 81.69 | 81.69 | 81.69 | 81.69 | 81.69 | 81.69 |
| Total Surfactant | 10 | 10 | 10 | 10 | 10 | 10 |
| pH | 8.3 | 8.3 | 8.3 | 8.3 | 8.3 | 8.3 |
| % cloudiness causing perfume ingredients by weight of perfume | 0 | 0 | 0 | 0 | 0 | 0 |
| % additional perfume ingredients by weight of perfume | 100 | 100 | 100 | 100 | 100 | 100 |
| % transmission | 78.0 | 77.3 | 76.6 | 78.3 | 71.8 | 72.8 |

$^A$Methyl dihydrojasmonate;
$^B$Ethylene brassylate;
$^C$Orange terpene;
$^D$Beta naphthol methyl ether;
$^E$Para hydroxy phenyl butanone;
$^F$Anisic aldehyde The Comparative Examples are made by combining the anionic surfactants into a mixing vessel followed by borate, chelant, and water. The materials are mixed with enough energy to start the incorporation of the material into a homogenous mixture. While mixing, solvents, nonionic surfactants, and builders are added into the formula. The pH of the formula is then adjusted to the target pH with either a caustic or acid. Once the correct pH has been obtained the remaining materials, adjunct materials, are added to the mixture which may include any dye, perfume or perfume raw material.

Inventive Examples

| | Inventive Example A | Inventive Example B | Inventive Example C | Inventive Example D | Inventive Example E | Inventive Example F |
|---|---|---|---|---|---|---|
| SLS | 2.8 | 2.8 | 2.8 | 2.8 | 2.8 | 2.8 |
| HLAS | 2.5 | 2.5 | 2.5 | 2.5 | 2.5 | 2.5 |
| C14-15EO7 | 4.7 | 4.7 | 4.7 | 4.7 | 4.7 | 4.7 |
| Perfume | $0.6^1$ | $0.6^1$ | $0.6^1$ | $0.6^2$ | $0.6^3$ | $0.6^3$ |
| Octanoic acid or C8/C10 blend | 0.25 | 0.5 | 1.0 | 1.0 | 0.25 | 0.5 |

-continued

| | | | | | | |
|---|---|---|---|---|---|---|
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.69 | 5.69 | 5.69 | 5.69 | 5.69 | 5.69 |
| Water | 81.44 | 81.19 | 80.69 | 80.69 | 81.44 | 81.19 |
| Total Surfactant | 10 | 10 | 10 | 10 | 10 | 10 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission of formula with octanoic acid | 78.0 | 79.0 | 79.6 | 70.2 | 75.9 | 76.4 |

| | Inventive Example G | Inventive Example H | Inventive Example I | Inventive Example J | Inventive Example K | Inventive Example L |
|---|---|---|---|---|---|---|
| SLS | 2.8 | 2.8 | 2.8 | 2.8 | 2.8 | 2.8 |
| HLAS | 2.5 | 2.5 | 2.5 | 2.5 | 2.5 | 2.5 |
| C14-15EO7 | 4.7 | 4.7 | 4.7 | 4.7 | 4.7 | 4.7 |
| Perfume | 0.6[3] | 0.6[4] | 0.6[4] | 0.6[4] | 0.6[5] | 0.6[6] |
| Octanoic acid or C8/C10 blend | 1.0 | 0.25 | 0.5 | 1.0 | 1.0 | 0.25 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.69 | 5.69 | 5.69 | 5.69 | 5.69 | 5.69 |
| Water | 80.69 | 81.44 | 81.19 | 80.69 | 80.69 | 81.44 |
| Total Surfactant | 10 | 10 | 10 | 10 | 10 | 10 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission of formula with octanoic acid | 74.8 | 78.2 | 78.7 | 79.1 | 78.6 | 73.0 |

| | Inventive Example M | Inventive Example N | Inventive Example O | Inventive Example P | Inventive Example Q | Inventive Example R |
|---|---|---|---|---|---|---|
| SLS | 2.8 | 2.8 | 2.8 | 2.8 | 2.8 | 2.8 |
| HLAS | 2.5 | 2.5 | 2.5 | 2.5 | 2.5 | 2.5 |
| C14-15EO7 | 4.7 | 4.7 | 4.7 | 4.7 | 4.7 | 4.7 |
| Perfume | 0.6[6] | 0.6[6] | 0.6[7] | 0.6[7] | 0.6[7] | 0.6[8] |
| Octanoic acid or C8/C10 blend | 0.5 | 1.0 | 0.25 | 0.5 | 1.0 | 0.25 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.69 | 5.69 | 5.69 | 5.69 | 5.69 | 5.69 |
| Water | 81.19 | 80.69 | 81.44 | 81.16 | 80.69 | 81.44 |
| Total Surfactant | 10 | 10 | 10 | 10 | 10 | 10 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |

-continued

| | | | | | | |
|---|---|---|---|---|---|---|
| % transmission of formula with octanoic acid | 73.3 | 73.1 | 76.2 | 76.5 | 76.5 | 77.0 |

| | Inventive Example S | Inventive Example T | Inventive Example U | Inventive Example V | Inventive Example W | Inventive Example X |
|---|---|---|---|---|---|---|
| SLS | 2.8 | 2.8 | 2.8 | 2.8 | 2.8 | 2.8 |
| HLAS | 2.5 | 2.5 | 2.5 | 2.5 | 2.5 | 2.5 |
| C14-15EO7 | 4.7 | 4.7 | 4.7 | 4.7 | 4.7 | 4.7 |
| Perfume | 0.6[8] | 0.6[8] | 0.6[9] | 0.6[9] | 0.6[9] | 0.6[10] |
| Octanoic acid or C8/C10 blend | 0.5 | 1.0 | 0.25 | 0.5 | 1.0 | 0.5 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.69 | 5.69 | 5.69 | 5.69 | 5.69 | 5.69 |
| Water | 81.19 | 80.69 | 81.44 | 81.16 | 80.69 | 81.16 |
| Total Surfactant | 10 | 10 | 10 | 10 | 10 | 10 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission of formula with octanoic acid | 77.7 | 78.4 | 72.3 | 78.2 | 78.6 | 76.6 |

| | Inventive Example Y | Inventive Example Z |
|---|---|---|
| SLS | 2.8 | 2.8 |
| HLAS | 2.5 | 2.5 |
| C14-15EO7 | 4.7 | 4.7 |
| Perfume | 0.6[10] | 0.6[11] |
| Octanoic acid or C8/C10 blend | 1.0 | 1.0 |
| borate | 1.4 | 1.4 |
| GLDA | 0.62 | 0.62 |
| Misc | 5.69 | 5.69 |
| Water | 81.19 | 80.69 |
| Total Surfactant | 10 | 10 |
| pH | 8.3 | 8.3 |
| % of formula CC perfume ingredients | 0.6 | 0.6 |
| % of formula non-CC perfume ingredients | 0 | 0 |
| % transmission of formula with octanoic acid | 76.4 | 77.4 |

| | Inventive Example AA | Inventive Example BB | Inventive Example CC | Inventive Example DD | Inventive Example EE | Inventive Example FF |
|---|---|---|---|---|---|---|
| SLS | 5.6 | 5.6 | 5.6 | 1.4 | 5.6 | 5.6 |
| HLAS | 5.0 | 5.0 | 5.0 | 1.25 | 5.0 | 5.0 |
| C14-15EO7 | 9.4 | 9.4 | 9.4 | 2.35 | 9.4 | 9.4 |

-continued

| | | | | | | |
|---|---|---|---|---|---|---|
| Perfume | $0.6^{2}$ | $0.6^{2}$ | $0.6^{2}$ | $0.6^{10}$ | $0.6^{10}$ | $0.6^{10}$ |
| Octanoic acid | 0.25 | 0.5 | 1.0 | 1.0 | 0.25 | 0.5 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.09 | 5.09 | 5.09 | 5.09 | 5.09 | 5.09 |
| Water | 72.04 | 71.79 | 71.29 | 86.29 | 72.04 | 71.79 |
| Total Surfactant | 20 | 20 | 20 | 5 | 20 | 20 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission | 78.0 | 78.2 | 78.5 | 76.4 | 78.9 | 78.6 |

| | Inventive Example GG | Inventive Example HH | Inventive Example II | Inventive Example JJ | Inventive Example KK | Inventive Example LL |
|---|---|---|---|---|---|---|
| SLS | 5.6 | 8.4 | 8.4 | 8.4 | 8.4 | 1.4 |
| HLAS | 5.0 | 7.5 | 7.5 | 7.5 | 7.5 | 1.25 |
| C14-15EO7 | 9.4 | 14.1 | 14.1 | 14.1 | 14.1 | 2.35 |
| Perfume | $0.6^{10}$ | $0.6^{10}$ | $0.6^{10}$ | $0.6^{10}$ | $0.6^{10}$ | $0.6^{11}$ |
| Octanoic acid | 1.0 | 0.25 | 0.5 | 1.0 | 2.0 | 0.5 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.09 | 5.09 | 5.09 | 5.09 | 5.09 | 5.09 |
| Water | 71.29 | 62.04 | 21.79 | 61.29 | 60.29 | 86.79 |
| Total Surfactant | 20 | 30 | 30 | 30 | 30 | 5 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission | 78.0 | 77.2 | 76.8 | 76.2 | 75.8 | 76.4 |

| | Inventive Example MM | Inventive Example NN | Inventive Example OO | Inventive Example PP | Inventive Example QQ | Inventive Example RR |
|---|---|---|---|---|---|---|
| SLS | 5.6 | 5.6 | 5.6 | 8.4 | 8.4 | 8.4 |
| HLAS | 5.0 | 5.0 | 5.0 | 7.5 | 7.5 | 7.5 |
| C14-15EO7 | 9.4 | 9.4 | 9.4 | 14.1 | 14.1 | 14.1 |
| Perfume | $0.6^{11}$ | $0.6^{11}$ | $0.6^{11}$ | $0.6^{11}$ | $0.6^{11}$ | $0.6^{11}$ |
| Octanoic acid | 0.25 | 0.5 | 1.0 | 0.25 | 0.5 | 1.0 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.09 | 5.09 | 5.09 | 5.09 | 5.09 | 5.09 |
| Water | 72.04 | 71.79 | 71.29 | 62.04 | 61.79 | 61.29 |
| Total Surfactant | 20 | 20 | 20 | 30 | 30 | 30 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission | 79.4 | 79.2 | 79.4 | 77.7 | 77.4 | 77.5 |

-continued

| | Inventive Example SS | Inventive Example TT | Inventive Example UU | Inventive Example VV | Inventive Example WW | Inventive Example XX |
|---|---|---|---|---|---|---|
| SLS | 8.4 | 1.4 | 5.6 | 5.6 | 5.6 | 8.4 |
| HLAS | 7.5 | 1.25 | 5.0 | 5.0 | 5.0 | 7.5 |
| C14-15EO7 | 14.1 | 2.35 | 9.4 | 9.4 | 9.4 | 14.1 |
| Perfume | 0.6[11] | 0.6[5] | 0.6[5] | 0.6[5] | 0.6[5] | 0.6[5] |
| Octanoic acid | 2.0 | 1.0 | 0.25 | 0.5 | 1.0 | 0.25 |
| borate | 1.4 | 1.4 | 1.4 | 1.4 | 1.4 | 1.4 |
| GLDA | 0.62 | 0.62 | 0.62 | 0.62 | 0.62 | 0.62 |
| Misc | 5.09 | 5.09 | 5.09 | 5.09 | 5.09 | 5.09 |
| Water | 60.29 | 86.29 | 72.04 | 71.79 | 71.29 | 62.04 |
| Total Surfactant | 30 | 5 | 20 | 20 | 20 | 30 |
| pH | 8.3 | 8.3 | 8.3 | 8.3 | 8.3 | 8.3 |
| % of formula CC perfume ingredients | 0.6 | 0.6 | 0.6 | 0.6 | 0.6 | 0.6 |
| % of formula non-CC perfume ingredients | 0 | 0 | 0 | 0 | 0 | 0 |
| % transmission | 77.5 | 78.9 | 79.3 | 79.4 | 79.3 | 78.8 |

| | Inventive Example YY | Inventive Example ZZ | Inventive Example AAA | Inventive Example BBB |
|---|---|---|---|---|
| SLS | 8.4 | 8.4 | 8.4 | 8.4 |
| HLAS | 7.5 | 7.5 | 7.5 | 7.5 |
| C14-15EO7 | 14.1 | 14.1 | 14.1 | 14.1 |
| Perfume | 0.6[5] | 0.6[5] | 0.6[5] | 0.6[5] |
| Octanoic acid | 0.5 | 1.0 | 2.0 | 3.0 |
| borate | 1.4 | 1.4 | 1.4 | 1.4 |
| GLDA | 0.62 | 0.62 | 0.62 | 0.62 |
| Misc | 5.09 | 5.09 | 5.09 | 5.09 |
| Water | 61.79 | 61.29 | 60.29 | 59.29 |
| Total Surfactant | 30 | 30 | 30 | 30 |
| pH | 8.3 | 8.3 | 8.3 | 8.3 |
| % of formula CC perfume ingredients | 0.6 | 0.6 | 0.6 | 0.6 |
| % of formula non-CC perfume ingredients | 0 | 0 | 0 | 0 |
| % transmission | 77.6 | 77.3 | 77.0 | 76.2 |

[1]Dihydromyrcenol;
[2]Hexyl cinnamic aldehyde;
[3]Methyl nonyl acetaldehyde
[4]Verdox;
[5]Tetrahydrolinalool;
[6]Methyl cedrylone
[7]Ionone gamma methyl;
[8] Flor acetate;
[9] Pyranol;
[10]Iso E Super
[11]Terpinyl acetate This specification incorporates by reference in their entirety all applications listed herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid detergent composition comprising:

a) from about 5% to about 20%, by weight of the composition, of surfactant;

b) from about 0.1% to 2.5%, by weight of the composition, of a C8-C10 fatty acid comprising octanoic acid, nonanoic acid, decanoic acid, or a combination thereof, wherein the ratio of surfactant to C8-C10 fatty acid by weight ranges from about 200:1 to about 2:1; and c) a perfume comprising a perfume ingredient which has a carbon to oxygen ratio by number of atoms of about 5:1 to about 20:1 and the molecular weight of the perfume ingredient is about 155 Daltons or higher;

wherein the perfume ingredient comprises dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof;

wherein the liquid detergent composition is a liquid and has a percent transmittance of at least 70%, wherein the transmittance is measured in the absence of opacifiers, structurants, and encapsulates.

2. The liquid detergent composition of claim 1, wherein the composition comprises from about 0.2% to about 5.0%, by weight of the composition of the perfume.

3. The liquid detergent composition of claim 1, wherein the surfactant comprises an anionic surfactant.

4. The liquid detergent composition of claim 1, wherein the perfume has about 10% or more by weight of the perfume of the perfume ingredient which has a carbon to oxygen ratio of about 5:1 to about 20:1 by number of atoms and the molecular weight of the perfume ingredient is about 155 Daltons or higher.

5. The liquid detergent composition of claim 1, wherein the perfume is free of undecalactone.

6. The liquid detergent composition of claim 1, wherein the surfactant comprises a combination of anionic surfactant and nonionic surfactant.

7. The liquid detergent composition of claim 1, wherein if the perfume ingredient includes an aromatic ring the aromatic ring is in resonance with at least 2 other atoms that are not components of another ring.

8. The liquid detergent composition of claim 1, wherein the composition is free of synthetic preservative.

9. The composition of claim 1, wherein the composition has a pH of about 6 to about 10, wherein the pH is measured as a 10% dilution.

10. A liquid detergent composition, comprising:

a) from about 5% to about 20% by weight of the composition of a surfactant comprising an anionic surfactant;

b) from about 0.2% to about 4% by weight of the composition of a perfume comprising a perfume ingredient comprising dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof, wherein the perfume ingredient comprises 10% or more by weight of the perfume; and c) from about 0.1% to 2.5% by weight of the composition of a C8-C10 fatty acid comprising octanoic acid, nonanoic acid, decanoic acid, or a combination thereof wherein the liquid detergent composition is a liquid and has a transmittance of at least 70%.

11. The liquid detergent composition of claim 10, wherein the ratio by weight of the surfactant to the C8-C10 fatty acid is from about 200:1 to about 2:1.

12. A method of solubilizing one or more perfume ingredients in a surfactant containing composition comprising:

combining the perfume ingredient with a C8-C10 fatty acid, wherein the perfume ingredient has a carbon to oxygen ratio by number of atoms of about 5:1 to about 20:1 and the molecular weight of the perfume ingredient is about 155 Daltons or higher;

wherein the perfume ingredient comprises dihydromyrcenol; hexyl cinnamic aldehyde; methyl nonyl acetaldehyde; ortho-tertiary butyl cyclohexyl acetate; tetrahydrolinalool; methyl cedrylone; alpha iso methyl ionone; a,4,5,6,7,7a-hexahydro-4,7-methanoinden-6-yl acetate; tetrahydro-2-isobutyl-4 methylpyran-4-ol, 7-acetyl, 1,2,3,4,5,6,7,8-octahydro-1,1,6,7-tetramethyl naphthalene; terpinyl acetate; or a combination thereof; and wherein the ratio by weight of surfactant to C8-C10 fatty acid is from about 200:1 to about 2:1 and the surfactant containing composition has a percent transmittance of at least 70%, and wherein the composition comprises from about 0.1% to 2.5% by weight of the C8-C10 fatty acid.

13. The method of claim 12, wherein the composition comprises from about 5% to about 20% by weight of the surfactant.

14. The method of claim 12, wherein if the perfume ingredient includes an aromatic ring the aromatic ring is in resonance with at least 2 other atoms that are not components of another ring.

15. The method of claim 14, wherein the C8-C10 fatty acid comprises octanoic acid, nonanoic acid, decanoic acid, or a combination thereof.

16. The method of claim 15, wherein the composition further comprises an encapsulate.

17. The liquid detergent composition of claim 1, wherein the liquid detergent composition comprises from about 0.25% to about 2.0%, by weight of the composition, of the C8-C10 fatty acid.

18. The liquid detergent composition of claim 10, wherein the liquid detergent composition comprises from about 0.25% to about 2.0%, by weight of the composition, of the C8-C10 fatty acid.

19. The method of claim 12, wherein the surfactant containing composition comprises from about 0.25% to about 2.0%, by weight of the composition, of the C8-C10 fatty acid.

* * * * *